(12) United States Patent
Liu

(10) Patent No.: US 11,342,770 B2
(45) Date of Patent: May 24, 2022

(54) CHARGE AND POWER SUPPLY CIRCUIT FOR A PORTABLE ELECTRONIC DEVICE, AND PORTABLE ELECTRONIC DEVICE

(71) Applicant: AdvanOrigin Co., Ltd., Hsinchu (TW)

(72) Inventor: Te-Hua Liu, Hsinchu (TW)

(73) Assignee: AdvanOrigin Co., Ltd., Hsinchu (TW)

( * ) Notice: Subject to any disclaimer, the term of this patent is extended or adjusted under 35 U.S.C. 154(b) by 115 days.

(21) Appl. No.: 17/037,346

(22) Filed: Sep. 29, 2020

(65) Prior Publication Data

US 2021/0367439 A1 Nov. 25, 2021

(30) Foreign Application Priority Data

May 20, 2020 (TW) .................................. 109116640

(51) Int. Cl.
*H02J 7/00* (2006.01)
(52) U.S. Cl.
CPC .......... *H02J 7/0063* (2013.01); *H02J 7/0068* (2013.01); *H02J 7/007182* (2020.01); *H02J 2207/30* (2020.01)
(58) Field of Classification Search
None
See application file for complete search history.

(56) References Cited

U.S. PATENT DOCUMENTS

| 9,030,155 | B1* | 5/2015 | Li | H02J 7/00047 |
| | | | | 320/137 |
| 2002/0062416 | A1* | 5/2002 | Kim | G06F 1/3215 |
| | | | | 710/305 |
| 2003/0070103 | A1* | 4/2003 | Kim | G06F 1/266 |
| | | | | 713/300 |
| 2010/0097030 | A1* | 4/2010 | Kim | G06F 1/1601 |
| | | | | 320/162 |
| 2011/0285343 | A1* | 11/2011 | Weng | H01M 10/46 |
| | | | | 320/162 |
| 2012/0306435 | A1* | 12/2012 | Tu | H02J 7/0072 |
| | | | | 320/107 |
| 2013/0207595 | A1* | 8/2013 | Helfrich | H02J 7/0042 |
| | | | | 320/107 |

* cited by examiner

*Primary Examiner* — Arun C Williams
(74) *Attorney, Agent, or Firm* — Hamre, Schumann, Mueller & Larson, P.C.

(57) ABSTRACT

A charge and power supply circuit includes: a first switch coupled between a first node and a positive terminal of a battery; a second switch coupled between a USB connector and one of the first node and a second node; a third switch coupled to a load in series between the first and second nodes; and a control unit controlling the switches. In a USB charge mode, an input voltage from the USB connector is permitted to charge the battery via the conducting first and second switches. In a battery supply mode, the battery is permitted to supply a battery voltage to the load via the conducting first and third switches. In a USB supply mode, the input voltage is permitted to be supplied to the load via the conducting second and third switches.

15 Claims, 5 Drawing Sheets

CHARGE AND POWER SUPPLY CIRCUIT FOR A PORTABLE ELECTRONIC DEVICE, AND PORTABLE ELECTRONIC DEVICE

CROSS-REFERENCE TO RELATED APPLICATION

This application claims priority of Taiwanese Patent Application No. 109116640, filed on May 20, 2020.

FIELD

The disclosure relates to a power supply, and more particularly to a charge and power supply circuit for a portable electronic device, and to a portable electronic device.

BACKGROUND

Nowadays, a portable electronic device (e.g., a flashlight, a desk lamp, an electric fan, etc.) is usually built with a universal serial bus (USB) charge circuit that can charge a rechargeable battery of the portable electronic device with an input voltage transmitting via a USB connector of the portable electronic device (i.e., USB power).

A conventional USB charge circuit shown in FIG. 1 is used as an independent charger to charge the rechargeable battery (e.g., a lithium-ion (Li-ion) battery), and cannot directly supply the USB power to a system load of the portable electronic device. In addition, during the charge of the rechargeable battery, detection of a voltage across the rechargeable battery by the conventional USB charge circuit will be affected if the rechargeable battery supplies power to the system load at the same time.

A conventional USB charge and power supply circuit shown in FIG. 2 can directly supply the USB power to the system load, and can charge the rechargeable battery during the supply of the USB power to the system load. However, when the portable electronic device is in a standby state, a diode (DQ1), a Schottky diode (D11) and a resistor (R11) of the conventional USB charge and power supply circuit cooperate with the rechargeable battery to form a leakage current loop, and the Schottky diode (D11) has a large reverse current, resulting in a large leakage current. In addition, during the supply of the USB power to the system load, most of the current flows through the Schottky diode (D11), resulting in heating up and power dissipation of the Schottky diode (D11).

Therefore, when designing a USB charge and power supply circuit, the followings are important issues: how to automatically stop the charge of the rechargeable battery when the USB power is supplied to the system load; how to minimize standby power consumption of the portable electronic device; how to automatically detect whether the USB power is received; how to automatically charge the rechargeable battery with the USB power during a time period where the portable electronic device is in the standby state; and how to provide short circuit or reverse current protection.

SUMMARY

Therefore, an object of the disclosure is to provide a charge and power supply circuit for a portable electronic device, and to provide a portable electronic device. The charge and power supply circuit can alleviate at least one drawback of the prior arts.

According to an aspect of the disclosure, the charge and power supply circuit is to be used in a portable electronic device. The portable electronic device includes a universal serial bus (USB) connector, a rechargeable battery and a load. The charge and power supply circuit includes a first switch, a second switch, a third switch and a control unit. The first switch is adapted to be coupled between a first reference node and a positive terminal of the rechargeable battery, is to receive a first control signal, and switches between an ON state and an OFF state based on the first control signal. The second switch is adapted to be coupled between the USB connector and one of the first reference node and a second reference node, is to receive a second control signal, and switches between an ON state and an OFF state based on the second control signal. The second reference node is adapted to be coupled to a negative terminal of the rechargeable battery. The third switch is adapted to be coupled to the load in series between the first and second reference nodes, is to receive a third control signal, and switches between an ON state and an OFF state based on the third control signal. The control unit is adapted to be coupled to the rechargeable battery and the USB connector, and is further coupled to the second reference node and the first to third switches. The control unit is powered by an operation voltage related to a voltage at the first reference node, detects a voltage across the rechargeable battery and whether the USB connector receives an input voltage, is to receive an input signal related to an operation state of the portable electronic device, and generates the first to third control signals for receipt by the first to third switches based on a result of the detection and the input signal. Under a circumstance where the control unit determines that the portable electronic device should operate in a standby state, the charge and power supply circuit enters a USB charge mode when the control unit determines that the USB connector starts to receive the input voltage, and enters a standby mode when the control unit determines that the USB connector no longer receives the input voltage or when the control unit determines that the rechargeable battery is sufficiently charged. In the USB charge mode, the control unit generates the first to third control signals in such a way that the first and second switches are in the ON state while the third switch is in the OFF state, so as to permit the input voltage to charge the rechargeable battery. In the standby mode, the control unit generates the second and third control signals in such a way that the second and third switches are in the OFF state, so as to permit the rechargeable battery to provide the operation voltage via the first switch. Under a circumstance where the control unit determines that the portable electronic device should switch from the standby state to an activated state, the charge and power supply circuit enters a battery supply mode when the control unit determines that the USB connector does not receive the input voltage, and enters a USB supply mode when the control unit determines that the USB connector receives the input voltage. In the battery supply mode, the control unit generates the first to third control signals in such a way that the first and third switches are in the ON state while the second switch is in the OFF state, so as to permit the rechargeable battery to supply a battery voltage to the load. In the USB supply mode, the control unit generates the first to third control signals in such a way that the second and third switches are in the ON state while the first switch is in the OFF state, so as to permit the input voltage to be supplied to the load.

According to another aspect of the disclosure, the portable electronic device includes a USB connector, a rechargeable battery, a load and the aforesaid charge and power supply circuit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
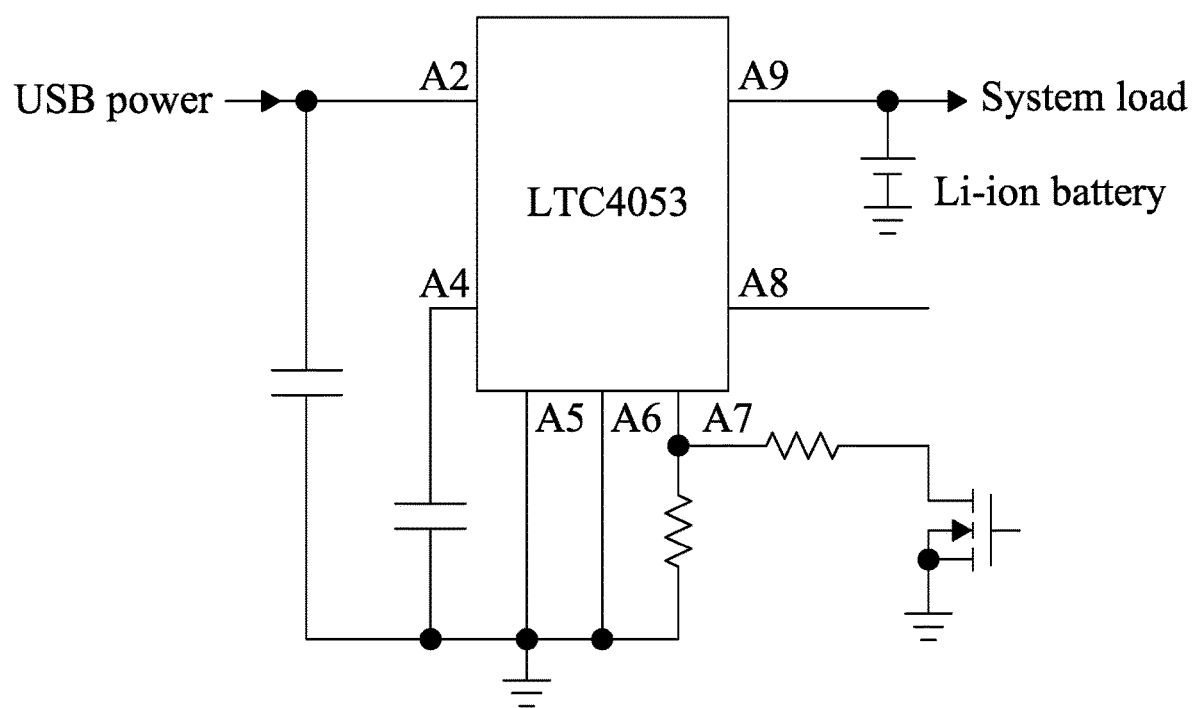
FIG. 1 is a circuit diagram illustrating a conventional universal serial bus (USB) charge circuit.
Figure 2:
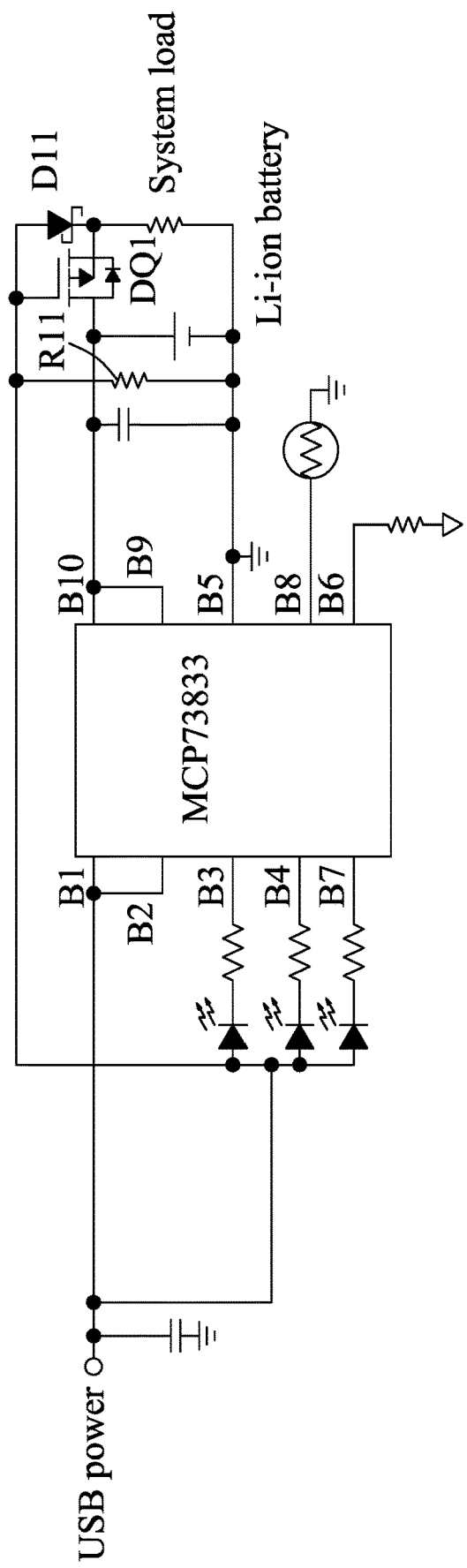
FIG. 2 is a circuit diagram illustrating a conventional USB charge and power supply circuit.

Before the disclosure is described in greater detail, it should be noted that where considered appropriate, reference numerals or terminal portions of reference numerals have been repeated among the figures to indicate corresponding or analogous elements, which may optionally have similar characteristics.

Moreover, it should be noted that throughout the disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout the disclosure should be interpreted as being such when looking at those elements alone.

Figure 3:
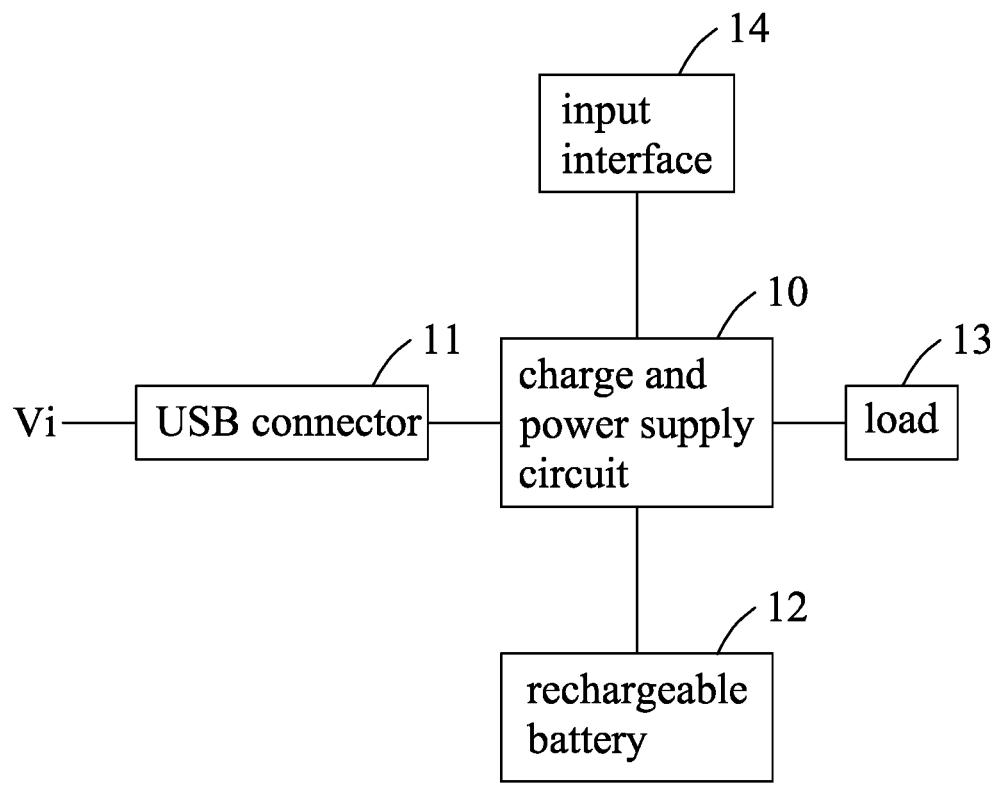
FIG. 3 is a block diagram illustrating a first embodiment of a portable electronic device according to the disclosure.
Figure 4:
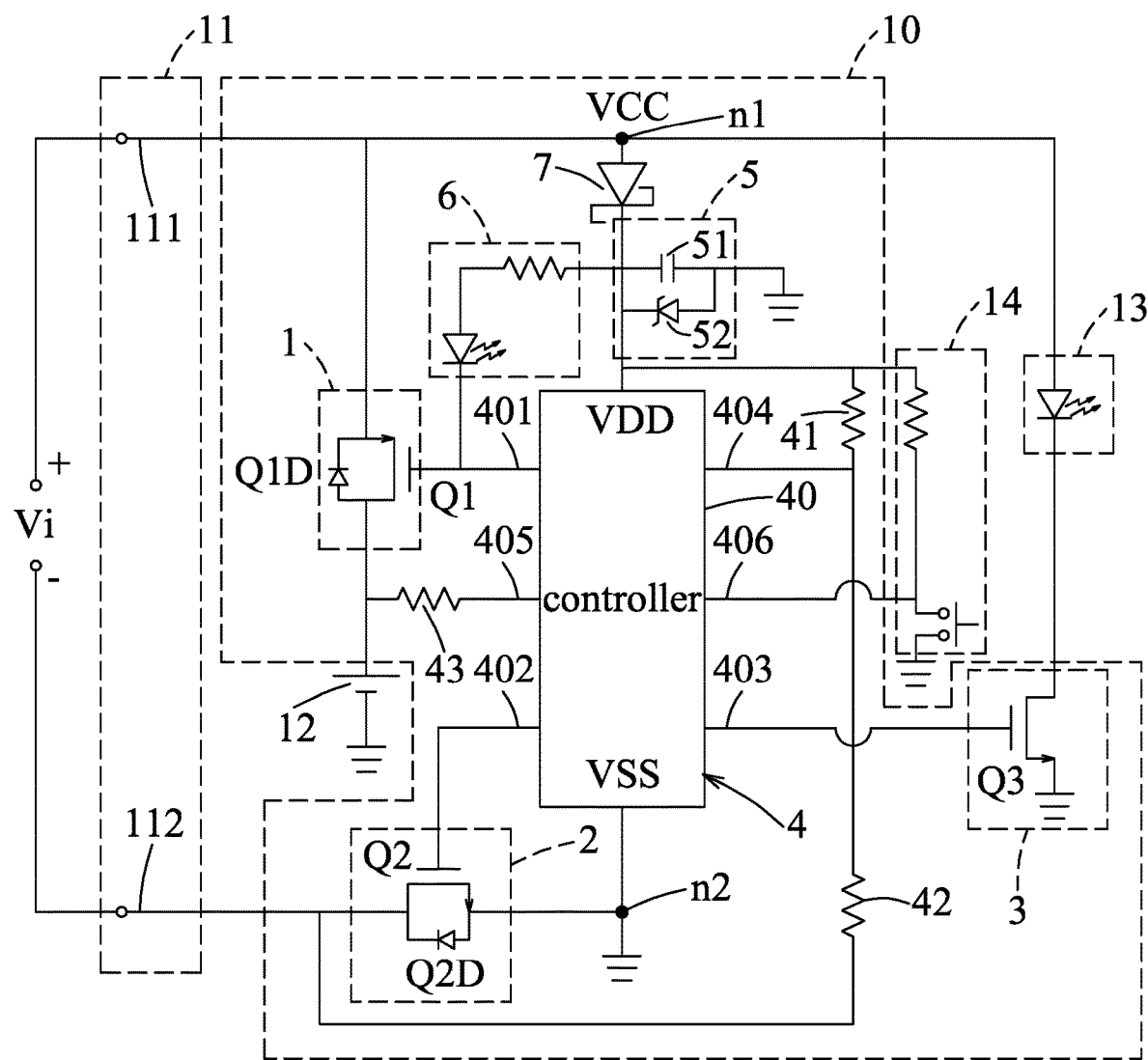
FIG. 4 is a circuit diagram illustrating a detailed circuit of the first embodiment.

Referring to FIGS. 3 and 4, a first embodiment of a portable electronic device according to the disclosure includes a universal serial bus (USB) connector 11, an input interface 14, a rechargeable battery 12, a load 13, and a charge and power supply circuit 10 that is coupled to the USB connector 11, the rechargeable battery 12, the load 13 and the input interface 14. In this embodiment, the portable electronic device is a flashlight, and is operable in one of two states that include a standby state (e.g., not emitting light) and an activated state (e.g., emitting light). However, in other embodiments, the portable electronic device may be a handheld fan or another device.

The USB connector 11 is to receive an input voltage (Vi). To be specific, when the USB connector 11 is coupled to a USB power supply (not shown) (e.g., a mobile power bank) via a USB cable (not shown), the USB connector 11 receives the input voltage (Vi) provided by the USB power supply. In this embodiment, the USB connector 11 includes a positive terminal 111 and a negative terminal 112.

In this embodiment, the load 13 includes at least one light emitting diode (LED) (FIG. 4 only depicts an LED).

In this embodiment, the input interface 14 includes a resistor and a switch. The resistor and the switch are coupled in series, with the resistor receiving an operation voltage and the switch coupled to ground. An input signal is provided at a common node of the resistor and the switch, and is related to the operation state of the portable electronic device. When the switch is not pressed, the switch is in an OFF state, and the input signal is at a logic "1" level. When the switch is pressed, the switch is in an ON state, and the input signal is at a logic "0" level to indicate that the operation state of the portable electronic device should be changed.

The charge and power supply circuit 10 is operable in one of four modes that include a standby mode, a USB charge mode, a battery supply mode and a USB supply mode. The charge and power supply circuit 10 includes a first reference node (n1), a second reference node (n2), a first switch 1, a second switch 2, a third switch 3, a control unit 4, a voltage stabilizer 5, an indicator 6 and a diode 7. A supply voltage (VCC) to the charge and power supply circuit 10 is received at the first reference node (n1). The second reference node (n2) serves as ground, and is coupled to the switch of the input interface 14.

The first switch 1 is coupled between the first reference node (n1) and the rechargeable battery 12, is to receive a first control signal, and switches between an ON state and an OFF state based on the first control signal. In this embodiment, the first reference node (n1) is coupled to the positive terminal 111 of the USB connector 11. The first switch 1 includes a P-type metal oxide semiconductor field effect transistor (pMOSFET) (Q1). The pMOSFET (Q1) has a source terminal that is coupled to the first reference node (n1), a drain terminal that is coupled to a positive terminal of the rechargeable battery 12 when the rechargeable battery 12 is correctly installed, and a gate terminal that is to receive the first control signal. The pMOSFET (Q1) provides a body diode (Q1D) having an anode that is coupled to the drain terminal of the pMOSFET (Q1), and a cathode that is coupled to the source terminal of the pMOSFET (01). The first switch 1 is in the ON state when the pMOSFET (Q1) conducts, and is in the OFF state when the pMOSFET (01) does not conduct. A negative terminal of the rechargeable battery 12 is coupled to the second reference node (n2) when the rechargeable battery 12 is correctly installed. In such a configuration, operation of the pMOSFET (Q1) is related to the charge of the rechargeable battery 12 by the input voltage (Vi) in the standby state, and to power supply by the rechargeable battery 12 in the standby state and the activated state.

In this embodiment, the second switch 2 is coupled between the negative terminal 112 of the USB connector 11 and the second reference node (n2), is to receive a second control signal, and switches between an ON state and an OFF state based on the second control signal. To be specific, the second switch 2 includes an N-type metal oxide semiconductor field effect transistor (nMOSFET) (Q2). The nMOSFET (Q2) has a source terminal that is coupled to the second reference node (n2), a drain terminal that is coupled to the negative terminal 112 of the USB connector 11, and a gate terminal that is to receive the second control signal. The nMOSFET (Q2) provides a body diode (Q2D) having an anode that is coupled to the source terminal of the nMOSFET (Q2), and a cathode that is coupled to the drain terminal of the nMOSFET (02). The second switch 2 is in the ON state when the nMOSFET (Q2) conducts, and is in the OFF state when the nMOSFET (Q2) does not conduct. In such a configuration, operation of the nMOSFET (Q2) is related to the charge of the rechargeable battery 12 by the input voltage (Vi) in the standby state, and to power supply by the input voltage (Vi) in the activated state.

The third switch 3 is coupled to the load 13 in series between the first and second reference nodes (n1, n2), is to receive a third control signal, and switches between an ON state and an OFF state based on the third control signal. In this embodiment, the load 13 (i.e., an anode of the LED) is coupled to the first reference node (n1), and the third switch 3 is coupled to the second reference node (n2). To be specific, the third switch 3 includes an nMOSFET (Q3). The nMOSFET (Q3) has a source terminal that is coupled to the second reference node (n2), a drain terminal that is coupled to the load 13 (i.e., a cathode of the LED), and a gate terminal that is to receive the third control signal. The third switch 3 is in the ON state when the nMOSFET (Q3) conducts, and is in the OFF state when the nMOSFET (O3) does not conduct. In such a configuration, operation of the nMOSFET (Q3) is related to output power of the load 13 in the activated state.

The diode 7 has an anode that is coupled to the first reference node (n1) to receive the supply voltage (VCC), and a cathode that is coupled to the resistor of the input interface 14 and that provides the operation voltage. In this embodiment, the diode 7 is a Schottky diode, but the disclosure is not limited thereto.

The control unit 4 is coupled to the cathode of the diode 7, the rechargeable battery 12, the USB connector 11, the input interface 14, the second reference node (n2) and the first to third switches 1-3. The control unit 4 is powered by the operation voltage from the cathode of the diode 7, detects a voltage across the rechargeable battery 12 and whether the USB connector 11 receives the input voltage (Vi), is to receive the input signal from the input interface 14, and generates the first to third control signals for receipt by the first to third switches 1-3 based on a result of the detection and the input signal. In this embodiment, the control unit 4 includes a controller 40, a first resistor 41, a second resistor 42 and a third resistor 43. The first and second resistors 41, 42 are coupled in series between the cathode of the diode 7 and the negative terminal 112 of the UBS connector 11, with the first resistor 41 coupled to the cathode of the diode 7 and the second resistor 42 coupled to the negative terminal 112 of the UBS connector 11. The third resistor 43 has a first terminal that is coupled to the positive terminal of the rechargeable battery 12, and a second terminal. The controller 40 is an eight-pin microcontroller (e.g., one having a model name of PIC12F1572), and has a power terminal (VDD) that is coupled to the cathode of the diode 7 to receive the operation voltage therefrom, a ground terminal (VSS) that is coupled to the second reference node (n2), three output terminals (401-403) that are respectively coupled to the gate terminals of the MOSFETs (Q1-Q3), a first input terminal 404 that is coupled to a common node of the first and second resistors 41, 42, a second input terminal 405 that is coupled to the second terminal of the third resistor 43, and a third input terminal 406 that is coupled to the common node of the resistor and the switch of the input interface 14 to receive the input signal therefrom. The controller 40 detects whether the USB connector 11 receives the input voltage (Vi) via the first input terminal 404 thereof, and detects the voltage across the rechargeable battery 12 via the second input terminal 405 thereof. The controller 40 generates, based on the result of the detection and the input signal, the first to third control signals at the output terminals 401-403 thereof for receipt by the gate terminals of the MOSFETs (Q1-Q3).

In this embodiment, under a circumstance where the second control signal is at the logic "0" level and thus the nMOSFET (Q2) does not conduct, the controller 40 determines whether the USB connector 11 receives the input voltage (Vi) based on a signal received at the first input terminal 404 thereof. When the signal received at the first input terminal 404 thereof is at the logic "0" level, the controller 40 determines that the USB connector 11 receives the input voltage (Vi). Otherwise, the controller 40 determines that the USB connector 11 does not receive the input voltage (Vi). Under a circumstance where the second control signal is at the logic "1" level and thus the nMOSFET (Q2) conducts, the controller 40 determines whether the USB connector 11 receives the input voltage (Vi) based on the operation voltage. When the operation voltage is greater than a rated voltage across the rechargeable battery 12 (e.g., 4.5V), the controller 40 determines that the USB connector 11 receives the input voltage (Vi). Otherwise, the controller 40 determines that the USB connector 11 does not receive the input voltage (Vi) In addition, the controller 40 estimates the voltage across the rechargeable battery 12 based on a voltage received at the second input terminal 405 thereof. Moreover, the controller 40 determines whether the operation state of the portable electronic device should be changed based on the input signal received at the third input terminal 406 thereof. When the input signal is at the logic "0" level, the controller 40 determines that the operation state of the portable electronic device should be changed. Otherwise, the controller 40 determines that the operation state of the portable electronic device should not be changed.

It should be noted that, in this embodiment, the signal/voltage received at each of the first to third input terminals 404-406 of the controller 40 must meet specific requirements (e.g., falling within a voltage range with a lower limit of −0.3V and an upper limit equal to a sum of the operation voltage and 0.3V). Under a circumstance where the nMOSFET (Q2) does not conduct while the USB connector 11 receives the input voltage (Vi), the signal received at the first input terminal 404 of the controller 40 has a voltage equal to a voltage across the second resistor 42 minus a forward voltage of the body diode (Q2D) (about 0.8V). To meet the specific requirements, resistances of the first and second resistors 41, 42 are designed in such a way that the voltage of the signal received at the first input terminal 404 of the controller 40 is, for example, 0V under the aforesaid circumstance. However, in another embodiment where it is not necessary to meet the specific requirements (e.g., the signal/voltage received at each of the first to third input terminals 404-406 is allowed to be −0.8V), the second resistor 42 may be omitted, and the first input terminal 404 of the controller 40 may be coupled to the negative terminal 112 of the USB connector 11. Moreover, in yet another embodiment, the controller 40 may be built with two pull-up resistors respectively coupled to the first and third input terminals 404, 406 thereof, and the first resistor 41 and the resistor of the input interface 14 may be omitted.

It should also be noted that, under a circumstance where the rechargeable battery 12 is detachable, the third resistor 43 (e.g., one having a resistance of 100Ω) does not affect the detection of the voltage across the rechargeable battery 12 when the rechargeable battery 12 is correctly installed, and can dramatically reduce heating up of the controller 40 when the rechargeable battery 12 is reversely installed.

The voltage stabilizer 5 is coupled to the cathode of the diode 7, and stabilizes the operation voltage. In this embodiment, the voltage stabilizer 5 includes a capacitor 51 and a Zener diode 52 that are coupled in parallel between the cathode of the diode 7 and the second reference node (n2). The Zener diode 52 has an anode that is coupled to the second reference node (n2), and a cathode that is coupled to the cathode of the diode 7. It should be noted that the Zener diode 52 makes the operation voltage not greater than a breakdown voltage thereof (e.g., 5.5V). In addition, the portable electronic device generally has a limited volume, so the capacitor 51 generally has a small capacitance. For example, the capacitor 51 is a multi-layer ceramic capacitor (MLCC) having a capacitance of 47 μF.

It should be noted that the diode 7 prevents current flow from the capacitor 51 to the first reference node (n1), so the operation voltage can be stabilized to ensure stable operation of the controller 40.

The indicator 6 is coupled to the output terminal 401 of the controller 40 to receive the first control signal therefrom, and generates, based on the first control signal, a visual output that indicates the operation mode of the charge and power supply circuit 10. In this embodiment, the indicator 6 includes a resistor and an LED that are coupled in series between the cathode of the diode 7 and the output terminal 401 of the controller 40, with the resistor coupled to the diode 7 and a cathode of the LED coupled to the output terminal 401 of the controller 40. The LED generates the visual output based on the first control signal, and switching thereof between emitting light and not emitting light is synchronous to switching of the pMOSFET (Q1) between conduction and non-conduction. In other words, when the first control signal is at the logic "0" level, the LED emits light and the pMOSFET (01) conducts, and when the first control signal is at the logic "1" level, the LED does not emit light and the pMOSFET (Q1) does not conduct.

Referring to FIG. 4, operations of the charge and power supply circuit 10 (especially actions performed by the controller 40 in the standby mode, the USB charge mode, the battery supply mode and the USB supply mode, and the visual output generated by the indicator 6) are described in detail below.

Under a circumstance where the controller 40 determines that the portable electronic device should operate in the standby state, the charge and power supply circuit 10 switches from the standby mode to the USB charge mode when the controller 40 determines that the USB connector 11 starts to receive the input voltage (Vi), and switches from the USB charge mode to the standby mode when the controller 40 determines that the USB connector 11 no longer receives the input voltage (Vi) or when the controller 40 determines that the rechargeable battery 12 is sufficiently charged.

In the standby mode, the controller 40 generates the first to third control signals that are respectively and constantly at the logic "1" level, the logic "0" level and the logic "0" level, so the pMOSFET (Q1) and the nMOSFETs (Q2, Q3) do not conduct, permitting the rechargeable battery 12 to provide the operation voltage via the body diode (Q1D) and the diode 7 with low power consumption when the USB connector 11 does not receive the input voltage (Vi), and permitting the operation voltage to be generated from the input voltage (Vi) via the diode 7 and the body diode (Q2D) when the USB connector 11 receives the input voltage (Vi). In addition, the rechargeable battery 12 is not permitted to supply a battery voltage to the load 3 when the USB connector 11 does not receive the input voltage (Vi), and the input voltage (Vi) is not permitted to be supplied to the load 13 when the USB connector 11 receives the input voltage (Vi), so the portable electronic device operates in the standby state where the load 13 does not emit light. Moreover, the LED of the indicator 6 does not emit light, which serves as the visual output to indicate the standby mode.

The USB charge mode includes a normal charge period, and optionally an additional charge period that is subsequent to the normal charge period.

In the normal charge period, the controller 40 generates the first to third control signals that are respectively at the logic "0" level, the logic "1" level and the logic "0" level, so the pMOSFET (Q1) and the nMOSFET (Q2) conduct while the nMOSFET (Q3) does not conduct, permitting the input voltage (Vi) to charge the rechargeable battery (12) via the pMOSFET (Q1) and the nMOSFET (Q2). Alternatively, the controller 40 may perform pulse width modulation (PMW) at a predetermined first frequency (e.g., several KHz) to generate the first control signal, and may reduce a duty cycle of the first control signal when it determines that the operation voltage is smaller than a predetermined safe voltage threshold (e.g., 4.8V). Each of the pMOSFET (Q1) and the nMOSFET (Q2) has a small conduction resistance, so a charge current for charging the rechargeable battery 12 may exceed 1A when the pMOSFET (Q1) continuously conducts. By performing PWM to generate the first control signal, the pMOSFET (Q1) alternates between conduction and non-conduction, preventing the charge current from being too large. In addition, the normal charge period ends when the controller 40 determines that the voltage across the rechargeable battery 12 is greater than or equal to a predetermined end voltage threshold (e.g., 4.2V). It should be noted that the controller 40 temporarily causes the pMOSFET (Q1) to not conduct, and detects whether the voltage across the rechargeable battery 12 is greater than or equal to the predetermined end voltage threshold at this time.

In the additional charge period, the controller 40 generates the first to third control signals that are at the logic "0" level, so the pMOSFET (Q1) conducts while the nMOSFETs (Q2, Q3) do not conduct, permitting the input voltage (Vi) to further charge the rechargeable battery 12 via the pMOSFET (Q1) and the body diode (Q2D). The additional charge period has a fixed time length. Since the controller 40 causes the nMOSFET (Q2) to not conduct, the supply voltage (VCC) is about 4.2V, thereby achieving current limit protection. In other embodiments, the controller 40 may cause the nMOSFET (Q2) to conduct. Alternatively, the additional charge period may have a variable time length, and ends when the controller 40 determines that the charge current is smaller than or equal to a predetermined end current threshold that corresponds to a C-rate of 0.03 $h^{-1}$. For example, the predetermined end current threshold is 99 mA when a rated capacity of the rechargeable battery 12 is 3300 mAh. It should be noted that the controller 40 performs the followings to measure the charge current: temporarily causing the pMOSFET (Q1) and the nMOSFET (Q2) respectively to not conduct and conduct, and measuring the operation voltage at this time to obtain a first voltage value (denoted as V1); measuring the operation voltage to obtain a second voltage value (denoted as V2) when the pMOSFET (Q1) conducts while the nMOSFET (Q2) does not conduct; calculating the forward voltage (denoted as Vf) of the body diode (Q2D) that is equal to V1-V2; and obtaining the charge current (denoted as Ic) based on the forward voltage of the body diode (Q2D) and voltage to current transfer data of the body diode (Q2D). The voltage to current transfer data of the body diode (Q2D) can be found in a specification of the nMOSFET (Q2). The following table exemplarily shows a portion of the voltage to current transfer data of the body diode (Q2D) at 25° C. As such, it is not necessary for the charge and power supply circuit 10 to include a resistor for sensing the charge current. It should be noted that a current flowing through the controller 40 from the power terminal (VDD)

thereof to the ground terminal (VSS) thereof is small (e.g., <1 mA) and can be neglected, so the charge current is substantially equal to a current flowing through the body diode (Q2D), and can be measured in the aforesaid way.

| Vf | ... | 0.65 V | ... | 0.6 V | ... |
| Ic | ... | 100 mA | ... | 80 mA | ... |

In both of the normal charge period and the additional charge period, the operation voltage is generated from the input voltage (Vi). Moreover, the input voltage (Vi) is not permitted to be supplied to the load 13, so the portable electronic device operates in the standby state where the load 13 does not emit light.

Immediately before the charge and power supply circuit 10 enters the USB charge mode, the controller 40 causes the first control signal to be temporarily at the logic "0" level once or twice, so the LED of the indicator 6 flashes once or twice, which serves as the visual output to indicate that the USB connector 11 starts to receive the input voltage (Vi). In the normal charge period, the LED of the indicator 6 flashes at high frequency, and the flash is perceived by human beings as continuous light emission because of persistence of vision. This serves as the visual output to indicate the normal charge period. In the additional charge period, the controller 40 further causes the first control signal to be periodically and temporarily at the logic "1" level at low frequency (e.g., the first control signal is at the logic "1" level for 0.1 second every three seconds), so the LED of the indicator 6 flashes at low frequency, and the flash is perceived by human beings as non-continuous light emission. This serves as the visual output to indicate the additional charge period.

Under a circumstance where the controller 40 determines that the portable electronic device should switch from the standby state to the activated state, the charge and power supply circuit 10 switches from the standby mode to the battery supply mode when the controller 40 determines that the USB connector 11 does not receive the input voltage (Vi), and switches from the standby mode or the USB charge mode to the USB supply mode when the controller 40 determines that the USB connector 11 receives the input voltage (Vi).

In the battery supply mode, the controller 4 generates the first and second control signals that are constantly at the logic "0" level, and performs PWM at a predetermined second frequency (e.g., 100 KHz) to generate the third control signal, so the pMOSFET (Q1) and the nMOSFET (Q2) respectively conducts and does not conduct while the nMOSFET (03) alternates between conduction and non-conduction, permitting the rechargeable battery 12 to supply a battery voltage to the load 13. Therefore, the portable electronic device operates in the activated mode where the LED of the load 13 flashes at the predetermined second frequency, and the flash is perceived by human beings as continuous light emission. In addition, the rechargeable battery 12 provides the operation voltage via the pMOSFET (Q1) and the diode 7, and the LED of the indicator 6 continuously emits light, which serves as the visual output to indicate the battery supply mode.

In the USB supply mode, the controller 4 generates the first and second control signals that are constantly at the logic "1" level, and performs PWM at the predetermined second frequency (i.e., 100 KHz) to generate the third control signal, so the pMOSFET (01) and the nMOSFET (Q2) respectively does not conduct and conducts while the nMOSFET (Q3) alternates between conduction and non-conduction, permitting the input voltage (Vi) to be supplied to the load 13. Therefore, the portable electronic device operates in the activated mode where the LED of the load 13 flashes at the predetermined second frequency, and the flash is perceived by human beings as continuous light emission. In addition, the operation voltage is generated from the input voltage (Vi), and the LED of the indicator 6 does not emit light, which serves as the visual output to indicate the USB supply mode.

Under a circumstance where the controller 40 determines that the portable electronic device should operate in the activated state, the charge and power supply circuit 10 switches from the USB supply mode to the battery supply mode when the controller 40 determines that the USB connector 11 no longer receives the input voltage (Vi), and switches from the battery supply mode to the USB supply mode when the controller 40 determines that the USB connector 11 starts to receive the input voltage (Vi). Under a circumstance where the controller 40 determines that the portable electronic device should switch from the activated state to the standby state, the charge and power supply circuit 10 switches from the USB supply mode to the USB charge mode when the controller 40 determines that the USB connector 11 receives the input voltage (Vi), and switches from the battery supply mode to the standby mode when the controller 40 determines that the USB connector 11 does not receive the input voltage (Vi).

Since the charge and power supply circuit 10 can automatically switches from the USB charge mode to USB supply mode, the input voltage (Vi) does not charge the rechargeable battery 12 when it is supplied to the load 13, preventing the USB power supply from having heavy loading, and ensuring stable operation of the load 13. Moreover, when the charge and power supply circuit 10 operates in the standby mode, neither the pMOSFET (Q1) nor the nMOSFET (Q2) conducts. At this time, if the USB connector 11 is short circuited (e.g., the positive and negative terminals 111, 112 of the USB connector 11 are coupled to each other because of insertion of an object), the body diode (Q2D) is reversely biased and does not conduct, preventing formation of a current loop to achieve short circuit or reverse current protection.

Figure 5:
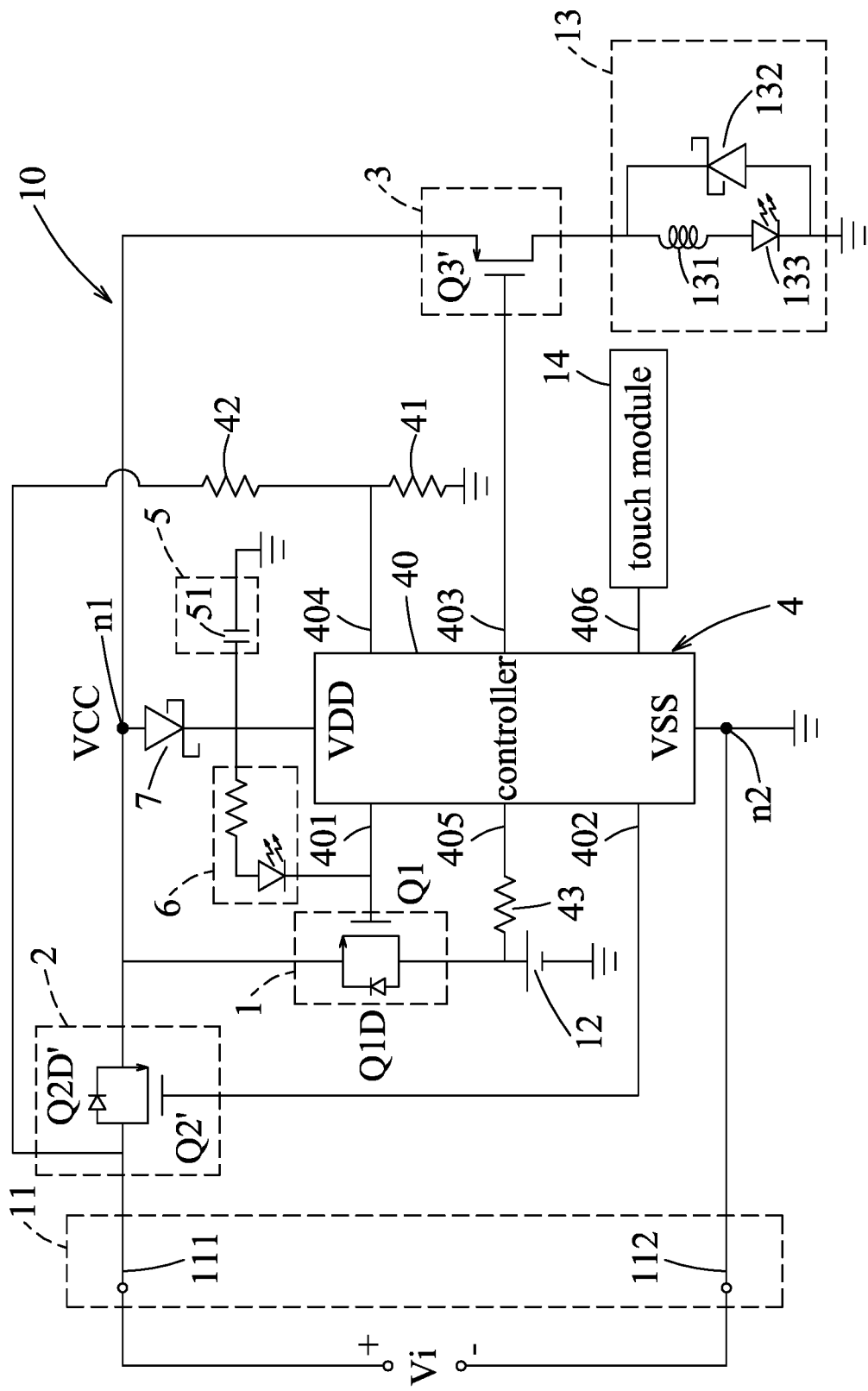
FIG. 5 is a circuit diagram illustrating a detailed circuit of a second embodiment of the portable electronic device according to the disclosure.

Referring to FIG. 5, a second embodiment of the portable electronic device according to the disclosure is similar to the first embodiment, but is different in what are described below.

In the second embodiment, the negative terminal 112 of the USB connector 11 is coupled to the second reference node (n2).

In this embodiment, the load 13 includes an inductor 131, an LED 133 and a Schottky diode 132. The inductor 131 and the LED 133 are coupled in series between the third switch 3 and the second reference node (n2), with the inductor 131 coupled to the third switch 3 and a cathode of the LED 133 coupled to the second reference node (n). The Schottky diode 132 is coupled in parallel to the series connection of the inductor 131 and the LED 133, and has an anode coupled to the second reference node (n2) and a cathode coupled to the third switch 3. The inductor 131, the LED 133 and the Schottky diode 132 cooperatively form a buck converter that can limit current.

In this embodiment, the input interface 14 is implemented using a touch module that generates the input signal based on an operation performed thereon. Since the touch module is well known in the art, and since it is not a feature of the disclosure, details thereof are omitted herein for the sake of brevity.

In this embodiment, the second switch 2 is coupled between the first reference node (n1) and the positive terminal 111 of the USB connector 11, and includes a pMOSFET (Q2'). The pMOSFET (Q2') has a source terminal that is coupled to the first reference node (n1), a drain terminal that is coupled to the positive terminal 111 of the USB connector 11, and a gate terminal that is coupled to the output terminal 402 of the controller 40 to receive the second control signal therefrom. The pMOSFET (Q2') provides a body diode (Q2D') having an anode that is coupled to the drain terminal of the pMOSFET (Q2'), and a cathode that is coupled to the source terminal of the pMOSFET (Q2'). In addition, the second control signal is complementary to that of the first embodiment.

In this embodiment, the third switch 3 is coupled between the first reference node (n1) and the load 13, and includes a pMOSFET (Q3'). The pMOSFET (Q3') has a source terminal that is coupled to the first reference node (n1), a drain terminal that is coupled to the inductor 131 of the load 13, and a gate terminal that is coupled to the output terminal 403 of the controller 40 to receive the third control signal therefrom. In addition, the third control signal is complementary to that of the first embodiment.

In this embodiment, the first and second resistors 41, 42 are coupled in series between the second reference node (n2) and the positive terminal 111 of the USB connector 11, with the first resistor 41 coupled to the second reference node (n2) and the second resistor 42 coupled to the positive terminal 111 of the USB connector 11. In addition, under a circumstance where the second control signal is at the logic "1" level and thus the pMOSFET (Q2') does not conduct, the controller 40 determines that the USB connector 11 receives the input voltage (Vi) when the signal received at the first input terminal 404 thereof is at the logic "1" level, and otherwise determines that the USB connector 11 does not receive the input voltage (Vi).

It should be noted that, as in the first embodiment, the signal/voltage received at each of the first to third input terminals 404-406 of the controller 40 must meet the specific requirements (i.e., falling within the voltage range with the lower limit of −0.3V and the upper limit equal to the sum of the operation voltage and 0.3V). Under a circumstance where the pMOSFET (Q2') does not conduct while the USB connector 11 receives the input voltage (Vi), the voltage of the signal received at the first input terminal 404 of the controller 40 is equal to a sum of the operation voltage and a forward voltage of the body diode (Q2D') (about 0.8V) minus a voltage across the second resistor 42 when a forward voltage of the diode 7 is neglected. To meet the specific requirements, the resistances of the first and second resistors 41, 42 are designed in such a way that the voltage of the signal received at the first input terminal 404 of the controller 40 is smaller than the sum of the operation voltage and 0.3V under the aforesaid circumstance. However, in another embodiment where it is not necessary to meet the specific requirements (e.g., the signal/voltage received at each of the first to third input terminals 404-406 is allowed to be equal to the sum of the operation voltage and 0.8V), the second resistor 42 may be omitted, and the first input terminal 404 of the controller 40 may be coupled the positive terminal 111 of the USB connector 11.

In this embodiment, the voltage stabilizer 5 only includes the capacitor 51. In other words, the Zener diode 52 (see FIG. 4) of the first embodiment is omitted.

Referring to FIGS. 4 and 5, in view of the above, for each of the aforesaid embodiments, the charge and power supply circuit 10 has the following advantages.

1. The charge and power supply circuit 10 can automatically detect whether the USB connector 11 receives the input voltage (Vi) from the USB power supply.

2. Under a circumstance where the portable electronic device should operate in the standby state, the charge and power supply circuit 10 can operate in the standby mode to minimize standby power consumption of the portable electronic device when the USB connector 11 does not receive the input voltage (Vi), and can automatically enters the USB charge mode to charge the rechargeable battery 12 with the input voltage (Vi) when the USB connector 11 starts to receive the input voltage (Vi).

3. When the portable electronic device should switches from the standby state to the activated state, the charge and power supply circuit 10 can switch from the USB charge mode to the USB supply mode, so as to automatically stop the charge of the rechargeable battery 12 and to supply the input voltage (Vi) to the load 13.

4. The charge and power supply circuit 10 can provide short circuit or reverse current protection.

5. The charge and power supply circuit 10 can dramatically reduce the heating up of the controller 40 when the rechargeable battery 12 is reversely installed.

6. The charge and power supply circuit 10 can automatically switch from the USB charge mode to the standby mode when the rechargeable battery 12 is sufficiently charged, so as to prevent overcharge of the rechargeable battery 12.

7. The charge and power supply circuit 10 can minimize power consumption of the elements of the portable electronic device other than the load 13 when operating in any one of the USB supply mode and the battery supply mode.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A charge and power supply circuit to be used in a portable electronic device, the portable electronic device including a universal serial bus (USB) connector, a rechargeable battery and a load, said charge and power supply circuit comprising:

a first switch adapted to be coupled between a first reference node and a positive terminal of the rechargeable battery, to receive a first control signal, and switching between an ON state and an OFF state based on the first control signal;

a second switch adapted to be coupled between the USB connector and one of the first reference node and a second reference node, to receive a second control signal, and switching between an ON state and an OFF state based on the second control signal, the second reference node being adapted to be coupled to a negative terminal of the rechargeable battery;

a third switch adapted to be coupled to the load in series between the first and second reference nodes, to receive a third control signal, and switching between an ON state and an OFF state based on the third control signal; and a control unit adapted to be coupled to the rechargeable battery and the USB connector, and further coupled to the second reference node and said first to third switches; said control unit being powered by an operation voltage related to a voltage at the first reference node, detecting a voltage across the rechargeable battery and whether the USB connector receives an input voltage, to receive an input signal related to an operation state of the portable electronic device, and generating the first to third control signals for receipt by said first to third switches based on a result of the detection and the input signal;

under a circumstance where said control unit determines that the portable electronic device should operate in a standby state, said charge and power supply circuit entering a USB charge mode when said control unit determines that the USB connector starts to receive the input voltage, and entering a standby mode when said control unit determines that the USB connector no longer receives the input voltage, or when said control unit determines that the rechargeable battery is sufficiently charged, in the USB charge mode, said control unit generating the first to third control signals in such a way that said first and second switches are in the ON state while said third switch is in the OFF state, so as to permit the input voltage to charge the rechargeable battery, in the standby mode, said control unit generating the second and third control signals in such a way that said second and third switches are in the OFF state, so as to permit the rechargeable battery to provide the operation voltage via said first switch;

under a circumstance where said control unit determines that the portable electronic device should switch from the standby state to an activated state, said charge and power supply circuit entering a battery supply mode when said control unit determines that the USB connector does not receive the input voltage, and entering a USB supply mode when said control unit determines that the USB connector receives the input voltage, in the battery supply mode, said control unit generating the first to third control signals in such a way that said first and third switches are in the ON state while said second switch is in the OFF state, so as to permit the rechargeable battery to supply a battery voltage to the load, in the USB supply mode, said control unit generating the first to third control signals in such a way that said second and third switches are in the ON state while said first switch is in the OFF state, so as to permit the input voltage to be supplied to the load.

2. The charge and power supply circuit of claim 1, wherein said first switch includes:

a first P-type metal oxide semiconductor field effect transistor (pMOSFET) having a source terminal that is coupled to the first reference node, a drain terminal that is coupled to the positive terminal of the rechargeable battery, and a gate terminal that is coupled to said control unit to receive the first control signal therefrom.

3. The charge and power supply circuit of claim 1, the USB connector including a positive terminal and a negative terminal, wherein:

the first reference node is adapted to be further coupled to the positive terminal of the USB connector;

said control unit is adapted to be further coupled to the negative terminal of the USB connector;

said second switch is adapted to be coupled between the second reference node and the negative terminal of the USB connector, and includes an N-type metal oxide semiconductor field effect transistor (nMOSFET) having a source terminal that is coupled to the second reference node, a drain terminal that is adapted to be coupled to the negative terminal of the USB connector, and a gate terminal that is coupled to said control unit to receive the second control signal therefrom.

4. The charge and power supply circuit of claim 3, wherein said control unit includes:

a controller having a power terminal which is to receive the operation voltage, a ground terminal which is coupled to the second reference node, three output terminals which are respectively coupled to said first to third switches, a first input terminal via which said controller detects whether the USB connector receives the input voltage, a second input terminal via which said controller detects the voltage across the rechargeable battery, and a third input terminal via which said controller is to receive the input signal; said controller generating, based on the result of the detection and the input signal, the first to third control signals at said output terminals thereof for receipt by said first to third switches; and two resistors adapted to be coupled in series between said power terminal of said controller and the negative terminal of the USB connector, a common node of said resistors being coupled to said first input terminal of said controller.

5. The charge and power supply circuit of claim 1, the USB connector including a positive terminal and a negative terminal, wherein:

said control unit is adapted to be further coupled to the positive terminal of the USB connector;

the second reference node is adapted to be further coupled to the negative terminal of the USB connector;

said second switch is adapted to be coupled between the first reference node and the positive terminal of the USB connector, and includes a second pMOSFET having a source terminal that is coupled to the first reference node, a drain terminal that is adapted to be coupled to the positive terminal of the USB connector, and a gate terminal that is coupled to said control unit to receive the second control signal therefrom.

6. The charge and power supply circuit of claim 5, wherein said control unit includes:
- a controller having a power terminal which is to receive the operation voltage, a ground terminal which is coupled to the second reference node, three output terminals which are respectively coupled to said first to third switches, a first input terminal via which said controller detects whether the USB connector receives the input voltage, a second input terminal via which said controller detects the voltage across the rechargeable battery, and a third input terminal via which said controller is to receive the input signal; said controller generating, based on the result of the detection and the input signal, the first to third control signals at said output terminals thereof for receipt by said first to third switches; and
- two resistors adapted to be coupled in series between the second reference node and the positive terminal of the USB connector; a common node of said resistors being coupled to said first input terminal of said controller.

7. The charge and power supply circuit of claim 1, further comprising:
- a voltage stabilizer coupled to said control unit, and stabilizing the operation voltage.

8. The charge and power supply circuit of claim 7, wherein said voltage stabilizer includes:
- a capacitor coupled between said control unit and the second reference node.

9. The charge and power supply circuit of claim 8, wherein said voltage stabilizer further includes:
- a Zener diode coupled to said capacitor in parallel, and having an anode that is coupled to the second reference node, and a cathode that is coupled to said control unit.

10. The charge and power supply circuit of claim 9, further comprising:
- a diode having an anode that is coupled to the first reference node, and a cathode that is coupled to a common node of said control unit, said capacitor and said Zener diode; said diode preventing current flow from said capacitor to the first reference node.

11. The charge and power supply circuit of claim 1, further comprising:
- an indicator coupled to said control unit to receive the first control signal therefrom, and generating, based on the first control signal, a visual output that indicates the operation mode of said charge and power supply circuit.

12. The charge and power supply circuit of claim 1, wherein:
- under a circumstance where said control unit determines that the portable electronic device should operate in the activated state, said charge and power supply circuit enters the battery supply mode when said control unit determines that the USB connector no longer receives the input voltage.

13. The charge and power supply circuit of claim 1, wherein:
- under a circumstance where said control unit determines that the portable electronic device should operate in the activated state, said charge and power supply circuit enters the USB supply mode when said control unit determines that the USB connector starts to receive the input voltage.

14. The charge and power supply circuit of claim 1, wherein:
- under a circumstance where said control unit determines that the portable electronic device should switch from the activated state to the standby state, said charge and power supply circuit enters the USB charge mode when said control unit determines that the USB connector receives the input voltage.

15. A portable electronic device comprising:
- a universal serial bus (USB) connector;
- a rechargeable battery;
- a load; and
- a charge and power supply circuit according to claim 1.

\* \* \* \* \*